United States Patent

[11] 3,618,016

[72] Inventor Hein Van Steenis
Amstelveen, Netherlands

[21] Appl. No. 878,502
[22] Filed Nov. 20, 1969
[45] Patented Nov. 2, 1971
[73] Assignee International Business Machines Corporation
Armonk, N.Y.
[32] Priority Nov. 29, 1968
[33] Netherlands
[31] 6817194

[54] CHARACTER RECOGNITION USING MASK INTEGRATING RECOGNITION LOGIC
20 Claims, 6 Drawing Figs.

[52] U.S. Cl. .................................................... 340/146.3 Y, 235/92 EA
[51] Int. Cl. .................................................... G06k 9/06
[50] Field of Search .......................................... 340/146.3; 235/92, 65, 64, 51, 59

[56] References Cited
UNITED STATES PATENTS
3,417,372 12/1968 Bieser .......................... 340/146.3
OTHER REFERENCES
Plummer, IBM Technical Disclosure Bulletin, " Decision Mechanism For An OCR Recognition System," Vol. 11, No. 11, April, 1969. pp. 1507 & 1508.

*Primary Examiner*—Thomas A. Robinson
*Assistant Examiner*—Leo H. Boudreau
*Attorneys*—Hanifin and Jancin and J. Michael Anglin

ABSTRACT: A graphic character is scanned and entered in a shift register. Combinatorial-logic masks detect respective video features from the shift register. Pulses from each mask advance separate counters. In a later decision cycle, a number of artificial pulses advance all counters simultaneously. When the first counter overflows, a number of further artificial pulses advance all counters. If one and only one counter overflows, the character is recognized; otherwise, the character is rejected. Either set of artificial pulses may be made variable.

PATENTED NOV 2 1971 3,618,016

SHEET 1 OF 2

INVENTOR.
HEIN VAN STEENIS
BY J. Michael Anglin
ATTORNEY

CHARACTER RECOGNITION USING MASK INTEGRATING RECOGNITION LOGIC introduction

The invention relates to character recognition equipment and more specifically to character recognition devices provided with a shift register matrix, wherein an exact representation of an area scanned on a document is stored.

While the scanned area moves across the document, new binary information is continuously fed to the matrix, in synchronism with the scanning, the previously stored information being shifted through the matrix. The matrix is designed so that stored information successively appears in all possible vertically and horizontally shifted positions in the matrix before being ejected. Due to the regular ejection of information, space becomes regularly available for storing new scanned information, which is added in proper fashion behind and beside the information still present, so that the matrix comprises a representation of the scanned area which is each time updated. Sooner or later a graphic character on the document is reached by the moving scanning area, whereupon information bits representing black raster points of the character pattern enter the matrix. Thus an exact representation of the unknown character is gradually built up as an information pattern growing and circulating in the matrix.

A number of different masks is connected to different sets of matrix storage positions. In this connection a mask is defined as an arbitrary, combinatory logical circuit, composed of a number of logical AND, OR and NOT circuits, connected to each other, but in the first place to the outputs of an arbitrary collection of matrix positions, in such a way that on a single mask output line there appears a signal, indicating whether a definite combination of information is either or not present in the matrix positions concerned. Consequently a mask is generally a composite pyramidal logical circuit, having a single output at the top and inputs connected to different matrix positions at the base and possibly at higher levels, The system comprises a separate mask circuit for each character identity to be recognized. Each mask circuit is designed so that the presence of an information pattern characteristic of the associated character is detected at the connected matrix points. The different mask circuits are separate from each other in this sense that they have separate outputs, are furthermore separate in some higher levels of the pyramids but may have parts at lower levels which are common to different masks and may finally be connected to both different and common matrix points. Furthermore it is in no way necessary that the different masks are connected to equal numbers of matrix points and have equal numbers of levels. Suitable mask circuits, also called logical statements, are designed experimentally, step by step, in a trial and error method.

Shortly after each shift of the stored information in the matrix the outputs of all mask circuits are sampled. A detection pulse on a mask output line is an indication of the presence of a combination of information in the matrix which is characteristic of the character concerned. The detection pulse is used for setting the corresponding position in a character register. For each character identity to be recognized the character register comprises a separate binary storage position, e.g. a latch circuit or a trigger. During the circulation of the binary information pattern of a scanned character through the matrix several cases may occur. If a single position of the character register is set, the scanned character has been recognized beyond doubt. However, if two or more positions are set simultaneously or shortly after each other, there is a conflict in the recognition. But if no position of the character register is set, recognition fails. Check circuits are connected to the outputs of all character register positions, in order to generate signals indicative of each of these three cases. Together with the output signals of the character register these check signals constitute the result of each character recognition cycle. These results are either buffered or used immediately for sorting documents, printing, output to a computer or for other purposes. After the result has been available in the character register for a suitable time, the register is reset. Then the system is ready for the recognition of the next scanned character on the same or a following document.

STATE OF THE ART

A device for character recognition as described in the foregoing is known from U.S. Pat. No. 3,105,956. FIGS. 3,8 and 9 thereof show examples of matrix shift registers. FIGS. 5 and 6 thereof illustrate simple examples of mask or statement circuits. FIG. 7 thereof shows the character register with the associated checking and timing control circuits.

An improved form of timing control circuits for the recognition cycle has been realized in the IBM 1418 Optical Character Reader, a machine which has been on the market for a number of years already. This machine is provided with an additional statement or mask circuit for observing combinations of information in the matrix which are considered as a minimum character requirement. A detection pulse from this additional mask circuit is indicative of information regarding a new scanned character. This signal is received by a timing control circuit synchronized with the scanning and inhibiting the character register inputs for detection pulses from the character masks after a predetermined interval. The result of the recognition cycle in the character register remains available for some time, whereupon the character register is reset. Only after a second predetermined interval is a new signal accepted from the additional mask circuit for minimum character requirement. In this way it is made certain that a deviation from the specified space between two successive graphic characters is permitted only up to a definite limit, so that too closely printed characters will be rejected.

Furthermore it is observed that from U.S. Pat. No. 3,165,717 a related character recognition system is known, using a shift register matrix, but wherein the scanned data do not circulate through the matrix in a continuous flow. In this case the matrix is filled columnwise under control of a timing circuit, after sufficient information indicative of the presence of a character has been found for the first time. Because it is certain that the scanned data has already been centered horizontally, the information in the matrix is shifted only vertically or "rolled." Also in this conventional device mask or statement circuits are used for the characters. In FIG. 10 and 11 of the patent mentioned in the foregoing an example of a statement circuit is given which is also illustrative of the present case.

A further development of the latter system is known from U.S. Pat. No. 3,233,219. In this patent it is stated that in practical cases it is difficult to draw up an absolute set of conditions or statements. To avoid this difficulty, partial statement circuits are used in this case, the outputs of which are summed, by means of a resistance network, in accordance with the statistically established probabilities for each character. The resistance network is a matrix, with an output line for each character identity to be recognized. During the rolling of information in the shift register matrix the lowest value of the current signal on the character output lines is searched. Hereby the most probable recognition of the character is indicated. Consequently, here the extreme probability is searched for among the probability values found for all characters in all positions of the rolled information. However, there is ,no summing or integrating of the probability for each separate character in all rolled positions.

Another modification of the recognition system in the above-mentioned U.S. Pat. No. 3,165,717 is schematically shown in "Multichannel Character Recognition System" by G. M. Berkin and K. H. Knickmeyer, IBM Technical Disclosure Bulletin, Vol. 6, No. 9, Feb. 1964, pp. 75 and 76. In this system the scanned data are examined per vertical scan column. The number of black raster points or cells is counted columnwise and after a minimum character requirement has been found, the black count in each column is converted, by means of statement circuits and a distributor, into different probability values or merit points for all different character identities. A number of counters are each assigned to a different character identity, in order to accumulate the merit points for the character concerned for all columns of the character. After termination of this cycle it is determined which counter indicates the highest count, which, therefore, corresponds to the most meritorious, i.e. the most probable recognition. This system does not use a matrix shift register, so that the geometrical form of the scanned character can be considered only incompletely. Deformed characters, or too heavy or too light ones cannot be reliably recognized then.

INVENTION

Although with conventional character readers, such as those mentioned in the foregoing, very satisfactory results have been achieved for the reading of documents on which the printing satisfies rather stringent specifications, in practice there remains the need of a machine for reading characters printed under less stringent conditions. Therefore it is an object of the invention to satisfy this need. More specifically it is an object of the invention to provide a device for reading characters which renders it possible to reliably identify heavy and light printing and also mutilated characters.

A difficulty in conventional devices was to draw up a set of absolute conditions or logical statements, each permitting of the recognition of a separate character identity, with the exclusion of all other character identities. One cause of this difficulty was the exclusiveness or uniqueness of the statement circuits. The appearance of a detection pulse from a statement or mask circuit immediately led to recognition and upon appearance of a pulse from one of the other mask circuits there was immediately a conflict, as set forth in the foregoing. It is another object of the invention to simplify the design of mask or statement circuits. More specifically it is an object of the invention to provide an improved character recognition system, wherein the statements are characteristic of the characters, however, without being absolute and unique for one assigned character identity under all practical circumstances. Another limitation of conventional character recognition devices, which is sometimes experienced as a deficiency, is the lack of flexibility, because the device operates in only one invariable fashion, and cannot be adapted to different requirements regarding the permissibility of character distortions and the required limits for failing and conflict errors for different applications. Therefore it is a further object of the invention to provide an improved character recognition device with additional flexibility levels by using different, selectively adjustable judgment thresholds.

In accordance with the invention a character recognition device of the kind described in the foregoing is provided, in order to realize the above-mentioned objects, with a number of counters, each assigned to a different character identity and connected to the corresponding combinatory detection circuit or mask circuit for counting the detection pulses delivered thereby, and furthermore decision means, comparing the counter contents for each character scanned, in order to generate signals for setting the character register. Preferably the counters and decision means are adapted to set the character register at unambiguous recognition of the character which corresponds to the counter with the highest count, provided the highest count is not smaller than a preselected minimum count and there is not found in the other counters a count within a preselected minimum distance from the highest count. In a favorable embodiment of the invention each counter is adapted to signal a predetermined extreme counter value on a line, connected to the set input of the corresponding position of the character register, the decision means being adapted to simultaneously send a train of artificial count pulses to all counters. Consequently the contents of all counters are increased an equal number of steps. The number of operative artificial count pulses will be measured by the decision circuits in dependence on the values for the preselected minimum count, the preselected minimum distance and the extreme counter value. Also the decision circuits must consider the appearance of a set signal for the character register, and that by thereafter transmitting only a number of operative artificial count pulses, equal to the preselected minimum distance. However, if no set signal for the character register has appeared, when the number of artificial count pulses has become equal to the difference between the extreme counter value and the preselected minimum count, the decision means will interrupt the train of operative artificial count pulses. Thus interruption may be effected by not transmitting further artificial count pulses or by inhibiting the set inputs of the character register for further signals from the counters.

Preferably the decision means are connected to settable switches on the console or to semipermanently settable switching means inside the machine cover, adapted for variable selection of the minimum count and the minimum distance. A further refinement is obtained by the provision of means varying the minimum distance in dependence on the value of the highest count, obtained in each individual case.

The foregoing and other objects, characteristics and advantages of the invention will be explained by describing a preferred embodiment of the invention with reference to the accompanying drawings, wherein FIG. 1 is a diagrammatic representation of a character recognition device comprising the invention;

PREFERRED EMBODIMENT OF THE INVENTION

Figure 1:
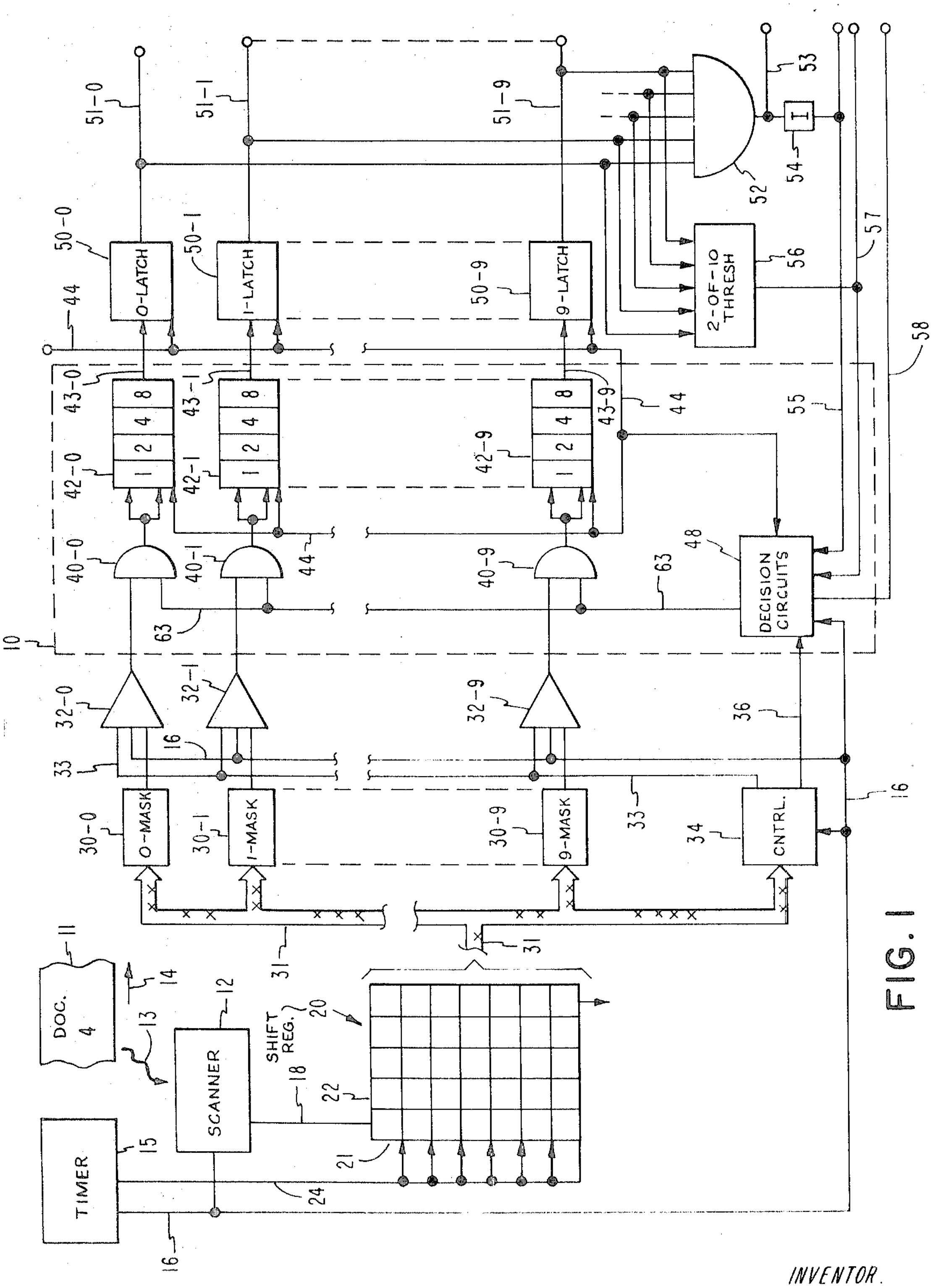

FIG. 1 is a diagrammatic representation of a character recognition device, substantially conforming to the description in the foregoing, but furthermore provided with the means according to the invention, diagrammatically shown inside the rectangle 10. More specifically, a paper document 11, on which a graphic character "4" is visible, is scanned by a scanning device 12 of any suitable design. The scanning process is symbolically represented by means of a light beam 13, originating from the graphic character and directed towards the scanner. Instead of optical scanning magnetic sensing may be used as well, or any other process by means of which the shape of the graphic character can be manifested to the scanner. Because document 11 moves in the direction 14, or because the scanning area of the scanner is otherwise shifted across the document, each character present is successively scanned from right to left. Under control of timing signals, generated in timing circuits 15 and applied, by way of line 16, to the scanner and the associated signal processing circuits 12, the latter circuits generate binary signals, representing black/white information at raster points of the scanned character pattern. Via line 18 these signals go to matrix register 20 to be temporarily stored therein.

Matrix register 20 is composed of many binary storage means, interconnected as a shift register. In the drawing matrix register 20 is diagrammatically shown as a rectangle, divided into rows and columns, each small square, such as 21 and 22, being located at the intersection of a row and a column and constituting an individual matrix register position, capable of storing a single bit value. A line 24 from timing circuit 15 is connected to all positions 21, 22 of shift register matrix 20. This line 24 serves to feed shift control pulses to all matrix positions simultaneously. The shift pulses on line 24 are generated in an alternating synchronized relation to the timing pulse train on line 16. Each shift pulse on line 24 has the effect that the binary information, stored in shift register matrix 20, is shifted one matrix position, in a path determined by the internal wiring of the matrix (not shown). This path for internally shifting information through all matrix positions and also the selected number of rows and columns in the matrix, should be designed in accordance with the parameters of the scanning process applied, as is well known and more fully described in the above-mentioned U.S. Pat. No. 3,105,956. Various possibilities are indicated therein, of which only the simplest case will be briefly described here.

For the sake of simplicity it is assumed that the scanning of a character is effected serially, column by column and in a column from bottom to top, starting with the column on the extreme right and thus proceeding to the left. Successive bit signal values appear on line 18, synchronously with the timing pulses on line 16. A bit value is stored in matrix position 21, located at the top of the matrix column at the extreme left. Thereupon a shift pulse appears on line 24 and the stored bit value in the left column is shifted down to the next position. At the same time the bit that was stored there, is shifted down to the third position in the same column, etcetera. A bit in the bottommost position of the left-hand column is shifted, via internal wiring, to the top most position 22 in the second column. Simultaneously the bit stored there is shifted down to the second position in the second column, etcetera. From the bottommost position of each column a bit value is shifted to the topmost position of the adjacent column on the right. A bit value shifted from the bottommost position of the column on the extreme right in the matrix has no place to go to and is discarded. This path for shifting information in the matrix is followed by each successive scanned bit. After each shift pulse on line 24 there appears a timing pulse on line 16, as a result of which a new bit value on line 18 is applied to input position 21. Thus, when the scanning process has reached a character on document 11, the black/white information regarding the column on the extreme right of this character will be entered bit by bit into the column at the extreme left of matrix 20; subsequently this information is shifted bit by bit to the second column of matrix 20, according as the second vertical column of the character is scanned. Inside the matrix a true representation of the scanned character is formed and shifted, and finally ejected from the last position. The complete information regarding a scanned character will remain in the matrix for some time, depending on the selected width, i.e. the number of columns of the matrix, and due to the circulating shift this information will appear in all possible positions in the matrix. In some positions the image of the character is cut in two parts, with the upper part of the image in the lower part of the matrix, and the reverse, whereas in a number of other positions the image of the character will appear as a single whole in the matrix. The object of causing the binary scanning information to circulate through the matrix is to obtain sooner or later a true image of the scanned character in a well-centered position in the matrix, and also to clear a position each time for storing new scanning information. The matrix 20 shown in FIG. 1 has only seven rows and five columns. This low number of thirty five matrix positions will permit only a coarse image of a scanned character. However, in practice a finer scanning raster and a correspondingly higher number of matrix elements will have to be used to make it possible to build up a representation of higher resolution in the matrix. For example, in the IBM Type 1418 machine a matrix register of seventeen rows and ten columns has been used.

All matrix positions 21, 22 are provided with signal output lines, on which the stored contents of the respective positions are manifested. A bundle of these output lines is diagrammatically represented at 31. It comprises the output lines of appropriately selected collections of matrix positions, connected to a number of character mask circuits 30–0 through 30–9, respectively. There are 10 mask circuits, each assigned to one of the digits 0 through 9, of which for the sake of simplicity only three are shown. Each mask circuit is a combinatory logical circuit with many inputs, connected to the signal outputs of an appropriately selected collection of matrix positions, and with a single output line. In each mask the input signals received are logically combined into a single output signal at any time. Consequently this output signal should be interpreted as an indication of the presence of absence of a predetermined combination of information in the connected matrix positions. Some further observations regarding the pyramidal structure of the mask circuits and some reference sources for definite examples thereof have been mentioned in the foregoing. A short time after the information has been shifted in matrix register 20, the outputs of the matrix positions will first have become settled to their new binary values and subsequently also the outputs of the character mask circuits. These output values are then sampled by the next timing pulse on the line 16, connected to a number of output AND-circuits 32–0 through 32–9, the other inputs of which are connected to the output lines of the masks 30–0 through 30–9, respectively. A third input line 33 to each of these output gates comes from circuit 34, comprising an additional mask circuit and associated timing control circuits. The additional mask circuit has many inputs, connected via cable 31 to the output lines of an appropriately selected collection of positions in matrix register 20, and a single output line (not shown). This mask circuit has been designed for detecting the presence or absence of definite combinations of information in the interconnected matrix positions, which information is considered as a minimum character requirement (MCR). Furthermore circuit 34 comprises suitable gate control circuits (not shown), designed in accordance with well-known constructive principles for the following purposes. A first gate control circuit is fired by an output signal of the MCR-mask circuit and will remain operative for supplying an output signal on output line 33 during an interval covering e.g. 21 shift pulses and 21 timing pulses on line 16. During this interval, which begins upon the first detection of a minimum character requirement in matrix register 20, the information in the matrix register will be shifted 21 times, consequently in the aggregate three columns to the right, and at the same time supplemented and centered in the matrix. As a result of this energizing signal on line 33 to the output gates 32–0 through 32–9 these gates are conditioned for supplying sampled output pulses during each timing pulse on line 16. A second gate control circuit in block 34 is fired by the end of the gate signal to line 33 and then remains operative during e.g. 16 shift pulses on line 24 and 16 timing pulses on line 16 for generating an output signal on line 36 to the decision circuits. This decision gate signal will cause a decision cycle. During this signal the information in matrix 20 will also be shifted, ultimately two columns to the right. During the conditioning gate signal on line 33 and the subsequent decision gate signal on line 36 the output of the MCR mask circuit in block 34 must be inhibited to prevent that another signal can become effective during this time. The definite choice of the duration of the two gate pulses generated in the circuits 34 is illustrative only and can be changed in a practical design in dependence on the matrix dimensions and the nominal character width in relation to the matrix. As mentioned before, in order to obtain a high-resolution character image it will be necessary to select a matrix of considerably larger dimensions. In general the conditioning gate pulse on line 33 should have such a duration that for such information in the matrix as has supplied a first MCR signal all horizontally more or less centered positions in the matrix are amply covered. For the decision gate pulse on line 36 the duration should on the one hand be sufficient for carrying out a decision cycle, but one hand the other hand not become so long that the total duration of the two gate pulses approaches too closely the duration corresponding to the nominal character width or pitch. In fact a considerable space should be left between the total duration of the two gate pulses and the pitch of the characters, in order to make it possible to read too closely printed characters all the same. These requirements can easily be met by using a matrix of larger dimensions than in this simple example.

The circuits provided by the invention are shown inside the rectangle 10 in FIG. 1. These comprise a number of binary counters 420 through 42–9, each consisting of four stages, numbered 1,2,4 and 8. The outputs of the gates 32–0 through 32–9 are each connected, by way of corresponding OR-circuits 40–0 through 40–9, to the count input of the corresponding binary counter. At the start all the counters 42 will be reset to zero. The capacity of each counter is 15. The sixteenth count pulse received will reset all four stages of the counter to zero and at the same time be transferred, by way of the corresponding counter output line 43, to the set input of the corresponding position in character register 50. Thus for each character scanned all counters 42 will be operative during the time, determined by the conditioning gate pulse on line 33, to count the sampled output pulses from the mask circuits 30 for each character identity separately. In other words, the counters build up a statistical survey, integrated on all appropriate centered positions of the character information in the matrix, illustrative of the degree in which each individual character mask 30 matches the character information scanned. This mask integrating cycle is terminated when the gates 32 are closed and a decision cycle is started by the decision gate pulse on line 36 to the decision circuits 48. These circuits are shown in greater detail in FIG. 2. The counters 42 are designed so that their capacity is large enough to prevent the appearance of an overflow signal on an output line 43 during the mask integrating cycle. Therefore, at the start of the decision cycle not any position of the character register 50 is set. It is up to the decision cycle to cause the setting of character register 50, as a result of which the ultimate recognition result is assembled.

Character register 50 comprises 10 separate positions, each consisting of a binary storage device 50–0 through 50–9. Each position is assigned to one of the character identities to be recognized and will be set by a pulse on overflow output line 43 from the corresponding binary counter. All positions can be reset by a signal on line 44, generated in circuits not shown. The set condition of a character register position is manifested by a signal on the associated output line 51. These signals can be sampled at the end of the decision cycle and then buffered or used as required by the application. The ultimate recognition result also includes the signals on the lines 53, 55, 57 and 58, which will now be described.

Check circuits 52, 54 and 56 are added to character register 50. All output lines 51 of this register are connected to inputs of OR-circuit 52 and of a combination circuit 56. An output signal from OR-circuit 52 on line 53 is applied to an output terminal and also to inverter circuit 54, having an output line 55. A signal on line 53 is an indication that at least one of the positions of the character register has been set. Consequently a signal on line 55 is an indication that no position in the character register has been set. This signal will at any rate be present at the beginning of each decision cycle. Logical combination circuit 56 delivers a signal on output line 57 only when two or more positions of the character register have been set. Consequently this signal is indicative of a recognition conflict. An example of the construction of similar character register register check circuits will be found in U.S. Pat. No. 3,165,717 mentioned in the foregoing, fig. 12. Finally, line 48 originates from the decision circuits 48, and will deliver a signal to an output terminal when the decision cycle has been completed. This signal can be used for sampling the output lines 51–0 through 51–9 and subsequently for generating a reset signal to be applied to said line 44, so that the counters 42 and character register 50 are reset.

Figure 2:
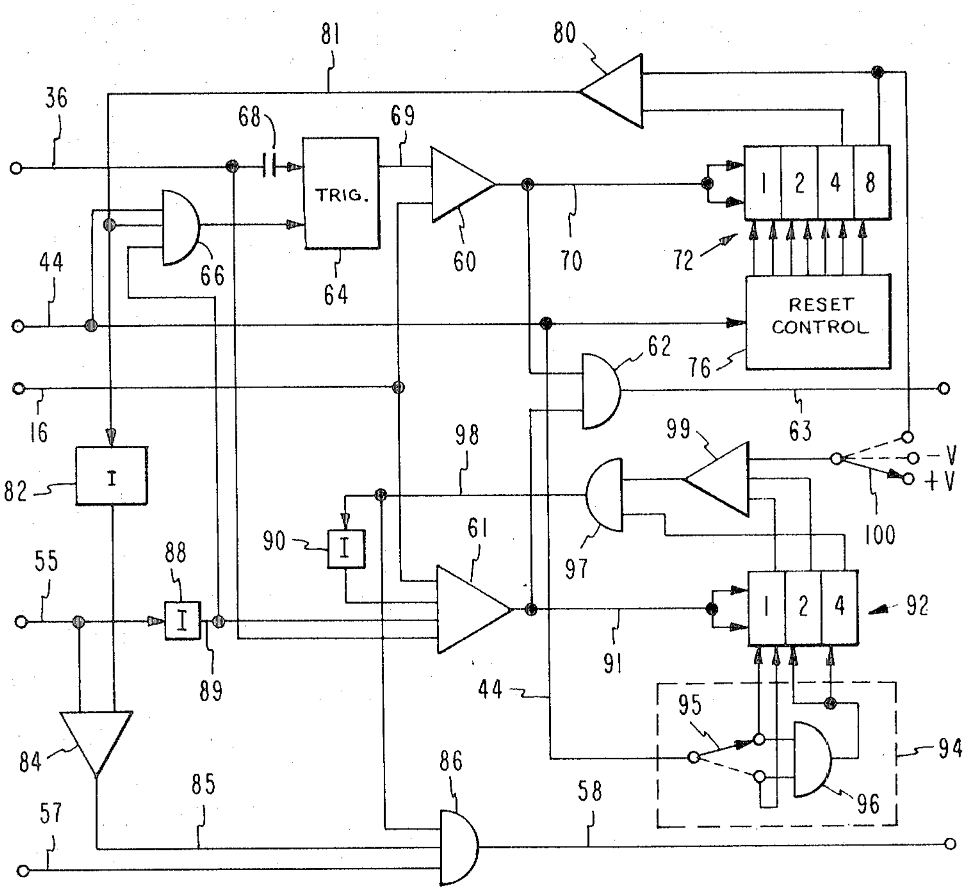
FIG. 2 is a diagrammatic representation of the decision circuits, which form part of the device of FIG. 1.

Fig. 2 is a detailed representation of the decision circuits 48 of fig. 1. These circuits are activated to carry out a decision cycle by the above-mentioned decision gate signal on input line 36. Their main function is to pass to the counters 42–0 through 42–9 (FIG. 1), via the associated OR-circuits 40 –0 through 40–9, a definite number of the timing pulses applied via input line 16 as artificial count pulses. This is carried out in fig. 2 by gating the timing pulses on line 16, either via AND-gate 60 or via an alternative AND-gate 61, to an OR-circuit 62 with output line 63, connected to all said OR-circuits 40. The operation is as follows.

The leading edge of a decision gate pulse on line 36 sets a trigger 64 via capacitor 68. The trigger had been reset previously, e.g. by the last preceding reset pulse on line 44, applied to the reset input of the trigger via OR-circuit 66. When the trigger is set, its output line 69 conditions AND-gate 60 to gate a number of successive timing pulses on line 16 along the path already described to all counters 42 simultaneously as artificial count pulses. Also the pulses gated by AND-circuit 60 are applied to the count input 70 of a binary counter 72 with four stages, numbered 1,2,4 and 8, respectively. Previously this counter had been reset to the initial reading by the last preceding pulse on reset line 44, connected to a reset control circuit 76 for this counter. For the moment it will be assumed that the initial reading of the counter is zero. Now counter 72 counts said artificial count pulses, emerging from AND-circuit 60. When the count twelve is reached, the counter supplies a signal via AND-circuit 80, whose inputs are connected to the set outputs of the stages 4 and 8 of this counter. Via line 81 the signal from AND-circuit 80 is applied to said OR-circuit 66 to reset trigger 64, so that AND-circuit 60 is no longer conditioned and this first path for the artificial count pulses is cut off. Consequently counter 72 does not receive further count pulses. The signal on line 81 is also applied, via delay 82, to an input of AND-gate 84, the other input of which is connected to line 55. It has already been elucidated that line 55 will be high at the beginning of the decision cycle, indicating that no position in the character register has been set. If this signal has not disappeared during the application of artificial count pulses along said first path via AND-gate 60, AND-gate 84 will be energized to deliver a signal on line 85, which passes to output line 58 by way of OR-circuit 86. As already stated, a signal on line 58 indicates that the decision cycle has been completed. A short delay, caused by delay circuit 82 is necessary, because it is possible that a character register position is set by the last artificial count pulse gated by AND-circuit 60. After a very short time the signal on line 55 will disappear, before the signal on line 81 can reach AND-gate 84. Then the decision cycle cannot be terminated in the manner described.

If the signal on line 55 disappears shortly after one of the artificial count pulses has been gated via the first path by AND-gate 60, inverter 88 will energize its output line 89. This signal will reset trigger 64 via OR-circuit 66, so that the first path is cut off and counter 72 cannot receive further count pulses. (Only in the case when counter 72 has just reached the count twelve, will the resetting of trigger 64 already have been effected by the pulse on line 81 described in the foregoing). Furthermore the signal on line 89 conditions AND-gate 61, another input of which was already enabled by the decision gate signal on line 36, a third input of this gate being enabled by the signal from inverter 90, which will be present initially. Consequently AND-gate 61 is now enabled for gating a number of successive timing pulses on line 16 to OR-circuit 62, which passes these pulses as further artificial count pulses along line 63 to all counters 42 simultaneously. This second train of gated pulses is also applied to the count input 91 of a binary counter 92 with three stages, numbered 1, 2 and 4, respectively. This counter had previously been reset to its initial reading by the last preceding reset pulse on line 44, applied to reset control circuit 94 of this counter. This circuit 94 generally comprises switches and logical circuits, connected so that out of a number of possible reset states one is preselected by appropriately setting the switches. In the example shown, circuit 94 comprises a two-position switch 95, the fixed contact of which switch is connected to line 44, the two other contacts being connected to the reset input and the set input of stage 1 in counter 92, respectively. By way of OR-circuit 96 the two other contacts are also connected to the reset inputs of the stages 2 and 4 in the counter. With switch 95 in the position shown in the drawing, a signal on line 44 reaches the reset input of each stage, in consequence of which zero has been selected as the initial reading of the counter. With the switch in the other position, the reading for count 1 would have been selected as the initial reading. Switch 95 may be located on the console of the machine or inside the cover, if desired as hubs in control panel, or the like.

The artificial count pulses gated along the second path via AND-gate 61 will continue, until a stop signal is transmitted from counter 92 to inverter 90 via OR-circuit 97 and line 98. Then the output signal of circuit 90 disappears, in consequence of which AND-gate 61 is no longer conditioned, to cut off the second path. Also, the signal on line 98 goes to OR-circuit 86, which delivers the signal End of Decision Cycle on line 58. Said signal from OR-circuit 97 may be generated in various ways. When counter 92 reaches the reading 3, an AND-gate 99 has two of its inputs enabled, which are connected to the set outputs of the stages 1 ans 2 in counter 92, respectively. If the third input, connected to the fixed contact of switch 100, was already enabled, AND-gate 99 supplies the signal for OR-gate 97, as a result of which the cycle is terminated. However, if the third input was not conditioned, AND-gate 99 will not be energized, so that counter 92 must step to reading 4, in consequence of which the set output of stage 4 delivers a signal direct to OR-gate 97. Summarizing, counter 92 will start with the reading 0 or 1, dependent on the setting of switch 95, and proceed to the final reading 3 or 4, dependent on the state of switch 100. The latter is a three-way switch, the poles of which are connected to the active level +V, the inactive level −V and the set output of stage 8 in counter 72, respectively. With switch 100 in the position shown in the drawing, the third input of AND-circuit 99 is always energized, so that counter 92 will be stopped at reading 3, However, if the inactive level is selected with switch 100, the third input is not enabled, so that counter 92 will be stopped at reading 4. However, in the third case the final reading of counter 92 will be dependent on the final reading reached by counter 72. If the latter had reached a count 8 or higher when stopped, the third input of AND-gate 99 is enabled via switch 100, so that counter 92 stops at count 3. If the final reading of counter 72 was lower than 8, the third input is not enabled, so that counter 92 stops at the final reading 4.

A third and last possibility to terminate the decision cycle is to connect line 57 to OR-circuit 86. A signal Conflict on line 57 thus supplies a signal End of Decision on line 58. This possibility can be omitted, the signal on line 57 being also present among the outputs for the ultimate recognition results, represented on the right in fig. 1.

To form a general idea of the importance of the decision cycle, it should be remembered that during the mask integrating cycle each counter 42 has accumulated the detection pulses or hits from the associated character mask. The highest count obtained during this cycle will yield the recognition of the character scanned, provided this highest count is not smaller than a preselected minimum count and no count is found in the other counters within a preselected minimum distance from the highest count. To satisfy the first condition, the decision circuits 48 transmit a first train of artificial count pulses, which is terminated when a first position of the character register has been set (signal line 55 in fig. 1, coupled through inverter 88 to signal line 89 in fig. 2) OR when a predetermined number of artificial count pulses has been reached. This predetermined number is made equal to the overflow count for the counters 42, less the preselected minimum count. In this embodiment the minimum count may be 4 to 8. The overflow count for the counters 42 amounts to 16. The maximum number of the first train of artificial count pulses is equal to the difference, and may therefore range from 12 to 8. The highest reading of counter 72, with which the number of the first artificial pulses is watched, is 12, and the initial reading of this counter may be selected from 0 to 4, in consequence of which from 12 to 8 first pulses are admitted. If it is assumed that the preselected minimum count is 5, the switches (not shown) in the reset control circuits 76 are set to set stage 1 and to reset the stages 2,4 and 8 upon arrival of a reset pulse on line 44. Then counter 72 counts from 1 to at most 12, so at most 11 first pulses. The highest number of 11 first pulses will cause overflow in a counter 42, e.g. 42–4, if this counter already contained the required minimum count 5. Position 50–4 of the character register is then set by the eleventh, i.e. the last possible pulse in the first series of artificial count pulses. If counter 42–4 had accumulated a higher hit count, position 50–4 will be set upon arrival of an earlier artificial count pulse of the first train. In both cases the decision cycle continues by generating a subsequent second train of artificial count pulses, via the second path through AND 61 in fig. 2. However, if the highest count among the counters 42, e.g. in 42–4, was less than 5, the first train of eleven artificial pulses will not cause overflow, and the decision cycle is terminated by the signal from AND 80 via AND 84 and OR 86, the signal fail on line 55 indicating the result. It will be clear that the reset control circuits 76 comprise switches and logical circuits and are designed in a fashion similar to the reset control circuits 94 for counter 92. The switches in the circuits 76 make it possible to select the reset positions from 0 to 4.

When it has been established that the highest count was at least equal to the preselected minimum count, the second train of artificial pulses is generated and counted in counter 92. The number of these pulses should be made equal to the preselected minimum distance. The initial reading of counter 92 is 0 or 1, dependent on switch 95. The final reading is 3 or 4, dependent on switch 100 and possibly on the final reading of counter 72. For example, it is assumed that the fixed minimum distance 2 is selected. Switch 100 remains in the position drawn and switch 95 is reversed. Now the initial reading is 1, the final reading 3, so that two pulses in the second train are gated, which will cause overflow in a counter 42, e.g. 42–9, if the count therein was only 1 or 2 lower than the highest count in counter 42–4. This causes the signal conflict on line 57. However, a count 2 in counter 42–9 is admissible with the highest count in counter 42–4 being 5. Now there is a sufficient distinction, because the 11+2=13 artificial count pulses just fail to cause the overflow count 16 in counter 42–9. If it is desired to increase the minimum distance, e.g. the minimum distance 4 is selected, for which switch 95 remains in the position shown and switch 100 is set at the central position for the inactive level. Counter 92 then counts from 0 to 4.

Flexibility is further increased by making the minimum distance dependent on the final reading of counter 72 with switch 100 in the third, upper position. With switch 95 in the position drawn, counter 92 counts from 0 to 3, if stage 8 of counter 72 was set, in other words, if counter 72, starting from the selected initial reading 1, has counted at least 7 first pulses. This means that the highest count in the counters 42 was at most 9 (and at least 5). Up to and including a highest count of 9 the minimum distance 3 is considered sufficient. With a highest count of 10 or more, a stronger discrimination is desired, which is obtained by AND-gate 99 not being enabled in this case, so that counter 92 then counts to 4. With a highest count of e.g. 11 in the counters 42, a highest count but one 6 is permitted, but 7 would cause a conflict. This example can be summarized in the following table.

TABLE I.—SWITCH 100 IN UPPER POSITION
[Minimum distance dependent on final reading 72 (initial reading=1)]

| Initial reading 92 (switch 95) | 0 | | 1 | |
|---|---|---|---|---|
| Final reading 72 | 2–7 | 8–12 | 2–7 | 8–12 |
| Final reading 92 | 4 | 3 | 4 | 3 |
| Minimum distance | 4 | 3 | 3 | 2 |
| Number of first pulses | 1–6 | 7–11 | 1–6 | 7–11 |
| Highest count in 42 | 15–10 | 9–5 | 15–10 | 9–5 |
| Permissible highest but one | 10–5 | 5–1 | 11–6 | 6–2 |

Table I shows that after setting switch 95 and the switches 76 the minimum distance is determined exclusively by the final reading of counter 72. Furthermore this table shows that a highest count but one 11 in the counters 42 is allowable, provided the highest count amounts to 15. Valid recognition of the character for which 15 was counted has then been obtained, in spite of the "wrong" count 11 in another counter. It also appears that a much lower value 5 for the highest count yields a valid identification as well, provided the highest count but one is correspondingly lower.

FIG. 3 is a diagrammatic representation of a seventeen row, 10 column matrix register in four conditions. At A it is illustrated that the information stored in the register may comprise a widely divergent number of 1-bits for a scanned character "4." For a light character, with which the print impact was insufficient or the ink ribbon all but used up, the line width in the matrix amounts to only one single position. For a heavy character, printed with great impact and a fresh ink ribbon, or printed with a worn type, the line width in the matrix amounts to three positions. Upon further deformations of the printed character all kinds of bit density variations may appear locally in the matrix. At B the minimum and maximum sizes for an unmutilated character "9" are shown in similar fashion, and the same could be done for the remaining digits. Now it is most difficult to design a set of logical statements or character masks, by which in some positions a 1-bit (black) is required and in other positions a 0-bit (white), in such a way that for each variation of the stored bit pattern the correct character mask will respond at least once and all other character masks never. The further one wishes to go in permitting deformed character images, which must be recognized all the same, the further character statement must be broadened and the sooner a deformed other character will also generate a response from the same mask. By discarding the requirement that not any wrong response may be generated, the invention succeeds in attaining that both light and heavy print and many deformations of characters can still be validly recognized. The discarded requirement is replaced by the milder requirement that wrong responses, integrated on all possible positions of the information in the matrix, may not become too numerous as compared with the number of correct responses. This less stringent requirement facilitates the finding of a set of logical statements for the characters to be recognized considerably. Besides, flexibility is provided, because the "not too numerous" could be defined differently under different circumstances The embodiment of the invention already described displays this flexibility by the possibilities provided in regard of minimum distance and minimum count selection.

Figure 3A:
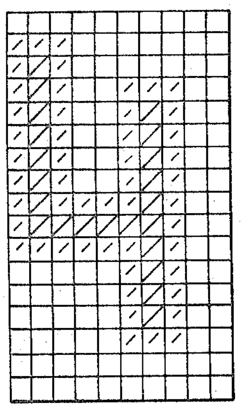
FIGS. 3A to 3D show four different diagrammatic representations of the same matrix register with a hypothetical, strongly simplified application.
Figure 3B:
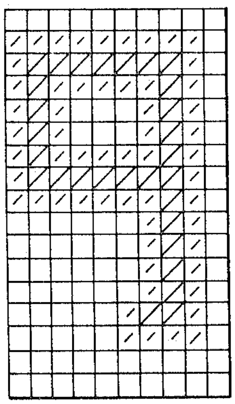
Figure 3C:
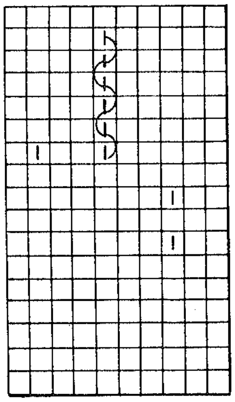
Figure 3D:
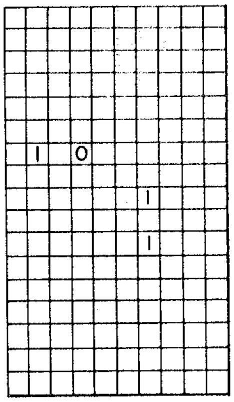

A too much simplified example may be useful to illustrate how, according to the invention, discrimination is effected. FIG. 3C shows a character mask for "9," FIG. 3D showing a mask for "4." The 4-mask looks for a combination of information in the matrix, with which there is a 1-bit in three definite positions and a 0-bit in a fourth position. The stored character information circulates along this mask in the matrix and the count of the responses obtained can be found manually by placing mask D on mask A and subsequently shifting it horizontally and vertically to all possible positions. It is easy to see that the light "4" will generate 7 responses or hits, corresponding to the positions in which the leftmost 1-bit of mask D coincides with one of the black positions of the leftmost vertical column of the light "4" in A. In similar fashion the number of responses of the 4-mask in D is found upon the appearance of a heavy 4, a thin 9 and a heavy 9, respectively. The 9-mask in C looks for a combination of at least four black bits in the matrix, with which the positions of three of these are exactly defined, while the fourth may be located in one of the six positions connected by a swinging line. This mask yields e.g. 6 responses for the light 9, namely in those positions in which the leftmost 1-bit of mask C coincides with one of the black positions of the leftmost column of the thin 9 in B. The results found are summarized in table II.

TABLE II

| | 9-mask | 4-mask |
|---|---|---|
| Light 4 | 0 | 7 |
| Heavy 4 6 | | 14 |
| Light 9 | 6 | 0 |
| Heavy 9 | 24 | 4 |

From table II it appears that the selected, too simplistic masks render good discrimination between the 4 and the 9 possible, if only the light or heavy 4 or 9 will appear as indicated. If minimum count 5 and minimum distance 4 are required, the light 4 is recognized because $7 \geq 5$, and the heavy 4 is recognized because $14 \geq 5$ and $14-6>4$.

It will be evident that the described embodiment may be altered in many ways within the scope of the invention. For example in each decision artificial count pulses may be transmitted in a fixed, maximally required number, the decision circuits then being used to inhibit the set inputs of the character register at the correct moment to thereby make the remaining count pulses ineffective. Mask statements for control symbols and alphabetic characters may be added, combined with a binary counter and further circuits for each mask added. Also, masks for various type designs may be added and hooked on by a logical OR, provided experimental runs show that discrimination has not deteriorated.

I claim as my invention:

1. An apparatus for recognizing an input pattern as belonging to one of a plurality of classes, said apparatus comprising:
  receiving means for accepting said pattern;
  a plurality of masks, each coupled to said receiving means for producing hit pulses when said pattern contains specified combinations of information characteristic of at least one of said classes;
  a plurality of counters coupled to said masks for accumulating said hit pulses from respective ones of said masks;
  first generator means for transmitting a first set of artificial hit pulses to all of said counters;
  sensing means coupled to said counters for producing a first output signal if a counter associated with one of said classes has attained a predetermined total, and for producing a second output signal if a plurality of counters, associated with a plurality of different ones of said classes, have attained said predetermined total;
  second generator means responsive to said first output signal for transmitting a second set of artificial hit pulses to said counters; and
  classifying means responsive to said first output signal for producing a recognition signal indicative of the identity of said input pattern, and responsive to said second output signal for inhibiting said recognition signal.

2. An apparatus according to claim 1, wherein said first generator means comprises:
  first gating means for transmitting a series of spaced pulses to said plurality of counters as said first set of artificial hit pulses;
  a threshold counter coupled to said first gating means for accumulating said first set of pulses;
  means coupled to said threshold counter for disabling said first gating means when said threshold counter has accumulated a predetermined number of said pulses; and
  means coupled to said sensing means for disabling said first gating means upon the occurrence of said first output signal.

3. An apparatus according to claim 2, wherein said first generator means further comprises means for resetting said threshold counter.

4. An apparatus according to claim 2, wherein each said mask comprises a plurality of digital logic circuits coupled to said receiving means, each said logic circuit being adapted to produce one of said hit pulses when said input pattern satisfies a logical statement defined by said circuit.

5. An apparatus according to claim 4, wherein said receiving means comprises a plurality of interconnected digital shift-register stages for accepting a digitized form of said input pattern from a scanner; and wherein each said logic circuit has a plurality of inputs each coupled to one of said stages.

6. An apparatus according to claim 2, wherein said sensing means comprises:
  a plurality of latches, each said latch being coupled to one of said plurality of counters and adapted to assume a "- set" state upon the occurrence of an overflow condition in said one counter;

register-set means coupled to said latches for producing said first output signal when at least one of said latches in said "set" state; and conflict means coupled to said latches for producing said second output signal when at least two of said latches are in said "set" state.

7. An apparatus according to claim 6, wherein said sensing means further comprises means coupled to said register-set means for producing a third output signal when none of said latches is in said "set" state, said third signal being indicative of a failure to recognize said input pattern.

8. An apparatus according to claim 2, wherein said second generator means comprises:

second gating means enabled by said first output signal for transmitting a series of spaced pulses to said plurality of counters as said second set of artificial hit pulses;

a minimum-distance counter coupled to said second gating means for accumulating said second set of pulses; and means coupled to said threshold counter for disabling said second gating means when said minimum-distance counter has accumulated a predetermined number of said spaced pulses.

9. An apparatus according to claim 8, wherein said second generator means further comprises means for resetting said minimum-distance counter to a predetermined "reset" state.

10. An apparatus according to claim 9, wherein said resetting means includes a switch for varying said "reset" state.

11. An apparatus according to claim 8, wherein said second generator means further comprises selective means coupled to said minimum-distance counter for varying said number of pulses in said second set of artificial pulses.

12. An apparatus according to claim 11, wherein said selective means includes a switch coupled between said minimum-distance counter and said means for disabling said second gating means.

13. An apparatus according to claim 11, wherein said selective means includes coupling means connected to said threshold counter for varying said number of pulses in said second set of artificial pulses in accordance with said number of pulses in said first set of artificial pulses.

14. An apparatus according to claim 11, wherein said selective means includes coupling means connected to said threshold counter for varying said number of pulses in said second set of artificial pulses in accordance with the number of pulses accumulated in said threshold counter.

15. An apparatus according to claim 14, wherein said minimum-distance counter has a plurality of stages; and wherein said means for disabling said second gating means includes a logic circuit having inputs connected to at least one of said stages for said second gating means upon the occurrence of a specified ones of said stage states.

16. An apparatus according to claim 15, wherein said threshold counter has a plurality of stages; and wherein said coupling means comprises means connected to at least one of said last-named stages for modifying said logic circuit so as to specify different ones of said minimum-distance-counter stage states.

17. An apparatus for classifying a first serial train of hit pulses, each said hit pulse being indicative of a specified combination of information contained in a scanned input pattern, said apparatus comprising:

a plurality of counters, each responsive to specified ones of said combinations for totalizing respective ones of said hit pulses;

means for transmitting a second serial train of pulses for incrementing all of said counters, the number of pulses in said second train being the lesser of a predetermined threshold number sufficient to cause one of said counters to assume a predetermined state;

means for transmitting a third serial train of pulses for incrementing all of said counters by a minimum-distance number, unless none of said counters has assumed said predetermined state; and means for detecting the number of said counters which have assumed said predetermined state, for producing a recognition signal if at least one of said counters has assumed said state, and for producing a conflict signal if a plurality of said counters have assumed said state.

18. An apparatus according to claim 17, further comprising means for modifying said minimum distance number as a function of the number of pulses is said second serial train.

19. An apparatus according to claim 18, wherein said detecting means is adapted to produce a reject signal if none of said counters has assumed said predetermined state.

20. An apparatus according to claim 19, wherein said means for transmitting said third train of pulses is adapted to be disabled by said reject signal.

* * * * *